US009205876B2

(12) United States Patent
Goto

(10) Patent No.: US 9,205,876 B2
(45) Date of Patent: Dec. 8, 2015

(54) PANEL JOINING STRUCTURE AND PANEL JOINING METHOD

(75) Inventor: Toshihiro Goto, Toyota (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 0 days.

(21) Appl. No.: 14/368,393

(22) PCT Filed: Dec. 28, 2011

(86) PCT No.: PCT/JP2011/080503
§ 371 (c)(1),
(2), (4) Date: Jun. 24, 2014

(87) PCT Pub. No.: WO2013/099018
PCT Pub. Date: Jul. 4, 2013

(65) Prior Publication Data
US 2014/0367996 A1 Dec. 18, 2014

(51) Int. Cl.
| | | |
|---|---|---|
| B60J 7/22 | (2006.01) | |
| B62D 27/02 | (2006.01) | |
| B62D 25/20 | (2006.01) | |
| B23K 31/02 | (2006.01) | |
| F16B 11/00 | (2006.01) | |

(52) U.S. Cl.
CPC ............ B62D 27/026 (2013.01); B23K 31/02 (2013.01); B62D 25/2036 (2013.01); B23K 2201/006 (2013.01); F16B 11/006 (2013.01)

(58) Field of Classification Search
CPC ............................... B60J 7/022; B62D 25/06
USPC ....................... 296/216.06–216.08
See application file for complete search history.

(56) References Cited

U.S. PATENT DOCUMENTS

| | | | | |
|---|---|---|---|---|
| 4,938,521 A | * | 7/1990 | Kunert | ........................ 296/96.21 |
| 5,669,657 A | * | 9/1997 | Miyazawa | ............... 296/216.06 |
| 7,673,932 B2 | * | 3/2010 | Dykman et al. | ......... 296/216.07 |
| 2001/0034978 A1 | * | 11/2001 | Iimori et al. | ................. 49/490.1 |
| 2009/0230733 A1 | | 9/2009 | Sugimura et al. | |

FOREIGN PATENT DOCUMENTS

| | | |
|---|---|---|
| JP | 01-172977 U | 12/1989 |
| JP | 02-059882 U | 5/1990 |
| JP | 03-091868 U | 2/2003 |
| JP | 2007-022262 A | 2/2007 |
| JP | 2009-214802 A | 9/2009 |

(Continued)

*Primary Examiner* — Glenn Dayoan
*Assistant Examiner* — Sunsurraye Westbrook
(74) *Attorney, Agent, or Firm* — Kenyon & Kenyon LLP

(57) ABSTRACT

An object is to restrain an adhesive from dropping or from being scraped off when a joining portion is adhered to a joined portion. A panel joining structure of the present invention includes: a first panel including a stepped portion extending in an intersecting direction with a vertical direction, and a joining portion extending toward a vertical direction upper side from one end of the stepped portion in the intersecting direction; and a second panel including a facing portion extending in the intersecting direction and superimposed on the stepped portion from the vertical direction upper side, a joined portion extending toward the vertical direction upper side from one end of the facing portion in the intersecting direction and joined to the joining portion by adhesion and welding, and a suspended portion extending toward a vertical direction lower side from the other end of the facing portion in the intersecting direction.

6 Claims, 6 Drawing Sheets

(56) References Cited

FOREIGN PATENT DOCUMENTS

| JP | 2009-214841 A | 9/2009 |
| JP | 2009214791 A | 9/2009 |
| JP | 2010-242943 A | 10/2010 |
| JP | 2011-098619 A | 5/2011 |

* cited by examiner

FIG. 3
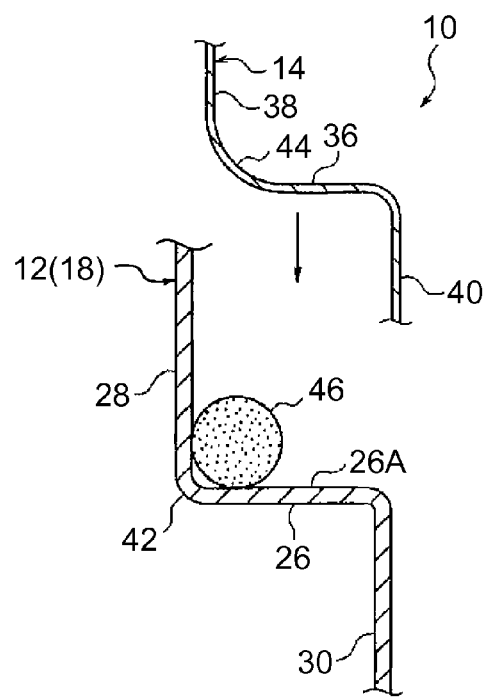
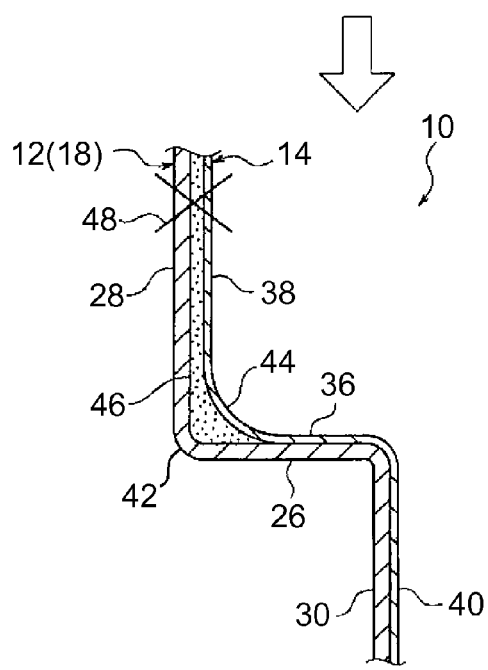

PANEL JOINING STRUCTURE AND PANEL JOINING METHOD

CROSS-REFERENCE TO RELATED APPLICATIONS

This is a national phase application based on the PCT International Patent Application No. PCT/JP2011/080503 filed Dec. 28, 2011, the entire contents of which are incorporated herein by reference.

TECHNICAL FIELD

The present invention relates to a panel joining structure and a panel joining method.

BACKGROUND ART

There has been conventionally known a vehicle body joining structure in which a joining portion and a joined portion respectively formed on an inner panel and an outer panel constituting a reinforcement are joined by adhesion and welding (see, for example, Patent Document 1).

CITATION LIST

Patent Documents

Patent Document 1: Japanese Patent Application Publication No. 2011-98619(JP 2011-98619 A)
Patent Document 2: Japanese Patent Application Publication No. 2007-22262 (JP 2007-22262 A)
Patent Document 3: Japanese Patent Application Publication No. 2010-242943 (JP 2010-242943 A)
Patent Document 4: Japanese Patent Application Publication No. 2009-214841 (JP 2009-214841)

SUMMARY OF THE INVENTION

Problem to be Solved by the Invention

However, in this structure, at the time of adhering the joining portion to the joined portion, for example, if an adhesive is applied to one of the joining portion and the joined portion in a state where the one of the joining portion and the joined portion is placed along a vertical direction, the adhesive may drop due to gravity.

Further, even in a case where such a state where the adhesive is applied to the one of the joining portion and the joined portion can be maintained, when the other one of the joining portion and the joined portion is moved along the vertical direction to come close to the one of the joining portion and the joined portion, the adhesive might be scraped off by the other one of the joining portion and the joined portion.

The present invention is accomplished in view of the above problems, and an object of the present invention is such that, in a panel joining structure including a first panel and a second panel having a joining portion and a joined portion to be joined by adhesion and welding, when the joining portion is adhered to the joined portion, an adhesive is restrained from dropping or from being scraped off.

Means for Solving the Problem

In order to solve the above problems, a panel joining structure of the present invention includes a first panel including a stepped portion extending in an intersecting direction with a vertical direction, and a joining portion extending toward a vertical direction upper side from one end of the stepped portion in the intersecting direction; and a second panel including a facing portion extending in the intersecting direction and superimposed on the stepped portion from the vertical direction upper side, a joined portion extending toward the vertical direction upper side from one end of the facing portion in the intersecting direction and joined to the joining portion by adhesion and welding, and a suspended portion extending toward a vertical direction lower side from the other end of the facing portion in the intersecting direction.

According to the panel joining structure, the above configuration makes it possible to join the first panel and the second panel according to the following procedure. That is, initially, in an adhesive application step, an adhesive is applied to a top surface of the stepped portion.

Subsequently, at least one of the first panel and the second panel is moved relative to the other one thereof in the vertical direction, so that the facing portion is superimposed on the stepped portion. Further, when the facing portion is superimposed on the stepped portion as such, the adhesive is extruded so as to be moved to between the joining portion and the joined portion. Then, the joining portion is adhered to the joined portion by the adhesive. Subsequently, in a welding process, the joining portion and the joined portion are welded. According to the above procedure, the first panel is joined to the second panel.

Here, in the panel joining structure, the stepped portion of the first panel extends in the intersecting direction with the vertical direction. Accordingly, even in a case where the adhesive is applied to the top surface of the stepped portion in the adhesion step as described above, it is possible to restrain the adhesive from dropping due to gravity.

Further, the second panel includes the suspended portion extending toward the vertical direction lower side from the facing portion, and the suspended portion is formed in the other end of the facing portion in the intersecting direction. Accordingly, even in a case where at least one of the first panel and the second panel is moved relative to the other one thereof in the vertical direction so that the facing portion is superimposed on the stepped portion in the adhesion step as described above, it is possible to restrain the adhesive applied to the top surface of the stepped portion from interfering with the suspended portion. This makes it possible to restrain the adhesive from being scraped off by the suspended portion.

Note that, in the panel joining structure, a connecting portion between the stepped portion and the joining portion may be a first bent portion having a curved section, a connecting portion between the facing portion and the joined portion may be a second bent portion having a curved section, and the second bent portion may have a curvature radius that is set larger than that of the first bent portion.

When the second bent portion has a curvature radius that is set larger than that of the first bent portion as such, it is possible to form a space between the first bent portion and the second bent portion. This allows the adhesive extruded when the facing portion is superimposed on the stepped portion, to be smoothly moved to between the joining portion and the joined portion via the space.

Further, in the panel joining structure, the first panel may include an upper-side joining portion as the joining portion, and a lower-side joining portion extending toward the vertical direction lower side from the other end of the stepped portion in the intersecting direction, and the second panel may include an upper-side joined portion as the joined portion, and a lower-side joined portion as the suspended portion joined to the lower-side joining portion by adhesion and welding.

As such, when the upper-side joining portion as the joining portion is joined to the upper-side joined portion as the joined portion by adhesion and welding, and the lower-side joining portion is joined to the lower-side joined portion as the suspended portion by adhesion and welding, it is possible to improve a joining strength between the first panel and the second panel.

Further, in the panel joining structure, the first panel may be a rocker inner panel constituting a vehicle-width-direction inner portion of a rocker provided in a floor side portion of a vehicle interior, and the second panel may be a floor panel constituting a floor of the vehicle interior.

According to the configuration of the panel joining structure of the present invention, it is possible to secure adhesion quality between the joining portion and the joined portion by restraining the adhesive from dropping and from being scraped off. Thus, when the first panel and the second panel are a rocker inner panel and a floor panel as described above, it is possible to improve a joining strength between the rocker inner panel and the floor panel.

Further, in order to solve the above problems, a panel joining method of the present invention is a panel joining method for joining the first panel and the second panel in the panel joining structure, and the panel joining method includes: an adhesive application step of applying an adhesive to a top surface of the stepped portion; an adhesion step of adhering the joining portion to the joined portion by the adhesive by moving at least one of the first panel and the second panel relative to the other one thereof in the vertical direction so as to superimpose the facing portion on the stepped portion and moving the adhesive to between the joining portion and the joined portion by superimposing the facing portion on the stepped portion; and a welding step of welding the joining portion and the joined portion.

According to the panel joining method, the adhesive is applied to the top surface of the stepped portion extending in the intersecting direction with the vertical direction in the adhesion step as described above, it is possible to restrain the adhesive from dropping due to gravity.

Further, the second panel includes the suspended portion extending toward the vertical direction lower side from the facing portion, and the suspended portion is formed in the other end of the facing portion in the intersecting direction. Accordingly, even in a case where at least one of the first panel and the second panel is moved relative to the other one thereof in the vertical direction so that the facing portion is superimposed on the stepped portion in the adhesion step as described above, it is possible to restrain the adhesive applied to the top surface of the stepped portion from interfering with the suspended portion. This makes it possible to restrain the adhesive from being scraped off by the suspended portion.

Advantageous Effects of Invention

As described above, according to the present invention, when a joining portion is adhered to a joined portion, it is possible to restrain an adhesive from dropping or from being scraped off.

BRIEF DESCRIPTION OF THE DRAWINGS

FIG. 3 is a view to describe a method for joining a rocker inner panel and a floor panel illustrated in FIG. 1.

MODES FOR CARRYING OUT THE INVENTION

[First Embodiment]
Initially, the following describes a first embodiment of the present invention.

Note that an arrow UP and an arrow OUT illustrated in each figure indicate a vehicle-up-down-direction upper side and a vehicle-width-direction outer side, respectively. A vehicle up-down direction is one example of a vertical direction in the present invention, and a vehicle width direction is one example of a direction intersecting with the vertical direction in the present invention.

Figure 1:
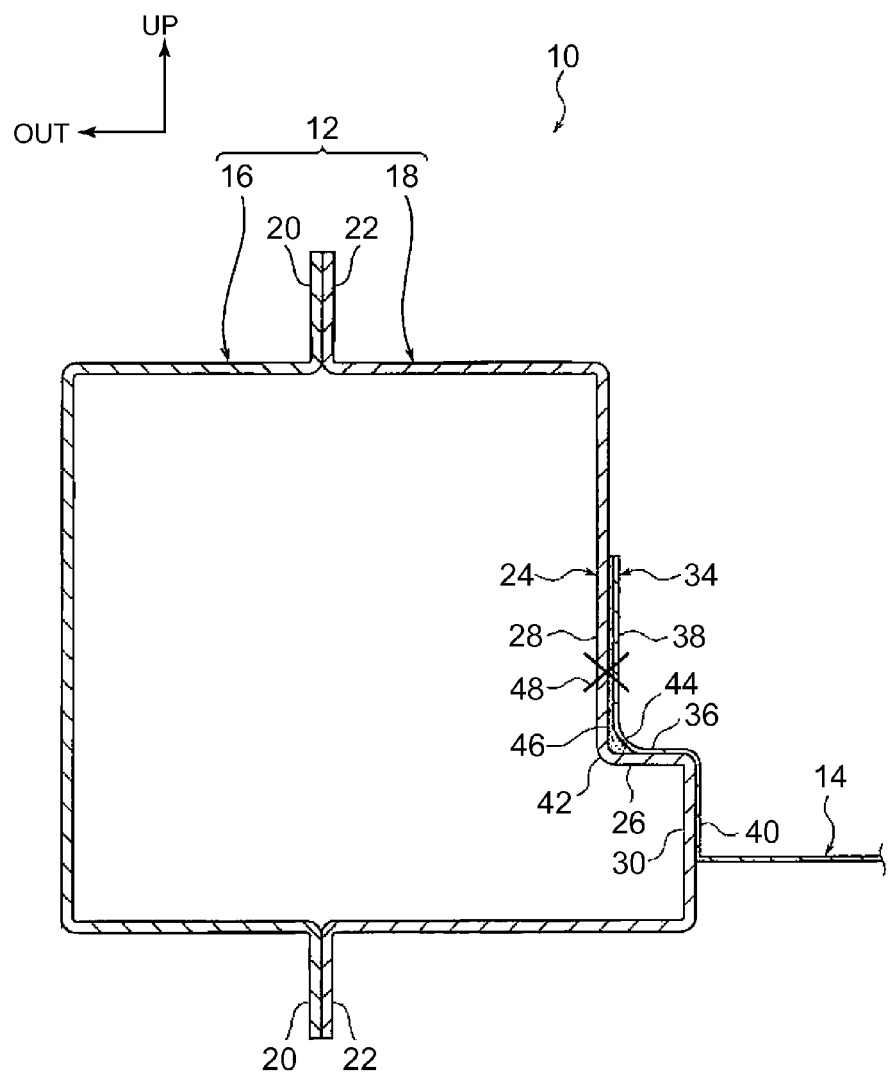
FIG. 1 is a sectional view of a panel joining structure according to a first embodiment of the present invention.

A panel joining structure 10 according to the first embodiment of the present invention as illustrated in FIG. 1 is applied to a vehicle body such as a passenger car, for example, and includes a rocker 12 and a floor panel 14. The rocker 12 is provided in a floor side portion of a vehicle interior, and extends in a vehicle longitudinal direction. The rocker 12 is formed to have a closed section in a front face view of the vehicle, and includes a rocker outer panel 16 and a rocker inner panel 18 divided in the vehicle width direction. The rocker inner panel 18 and the floor panel 14 are examples of a first panel and a second panel in the present invention.

The rocker outer panel 16 constitutes a vehicle-width-direction outer portion (an outer half) of the rocker 12, and is formed to have a hat-like section that is opened toward a vehicle-width-direction inner side in the front face view of the vehicle. In the meantime, the rocker inner panel 18 constitutes a vehicle-width-direction inner portion (an inner half) of the rocker 12, and is formed to have a hat-like section that is opened toward the vehicle-width-direction outer side in the front face view of the vehicle. The rocker outer panel 16 and the rocker inner panel 18 are joined to each other at flanges 20, 22 formed in respective upper end portions and respective lower end portions thereof.

Further, in a side wall 24 of the rocker inner panel 18 on the vehicle-width-direction inner side, a stepped portion 26 and a joining portion 28 are formed. The stepped portion 26 extends in the vehicle width direction as one example of an intersecting direction with the vehicle up-down direction in the present invention, and the joining portion 28 extends toward a vehicle upper side from one end of the stepped portion 26 on the vehicle-width-direction outer side. Further, a part of the side wall 24 on a vehicle lower side from the stepped portion 26 is a bottom wall portion 30, and the bottom wall portion 30 extends toward the vehicle lower side from the other end of the stepped portion 26 on the vehicle-width-direction inner side.

The floor panel 14 extends in the vehicle width direction and in the vehicle longitudinal direction, and constitutes a floor of the vehicle interior. In an end portion of the floor panel 14 on the vehicle-width-direction outer side, a side wall 34 extending toward the vehicle upper side is formed. A facing portion 36 and a joined portion 38 are formed in the side wall 34.

The facing portion 36 extends in the vehicle width direction similarly to the stepped portion 26, and the joined portion 38 extends toward the vehicle upper side from one end of the facing portion 36 on the vehicle-width-direction outer side. Further, a part of the side wall 34 on the vehicle lower side from the facing portion 36 is a suspended portion 40, and the suspended portion 40 extends toward the vehicle lower side from the other end of the facing portion 36 on the vehicle-width-direction inner side.

Figure 2:
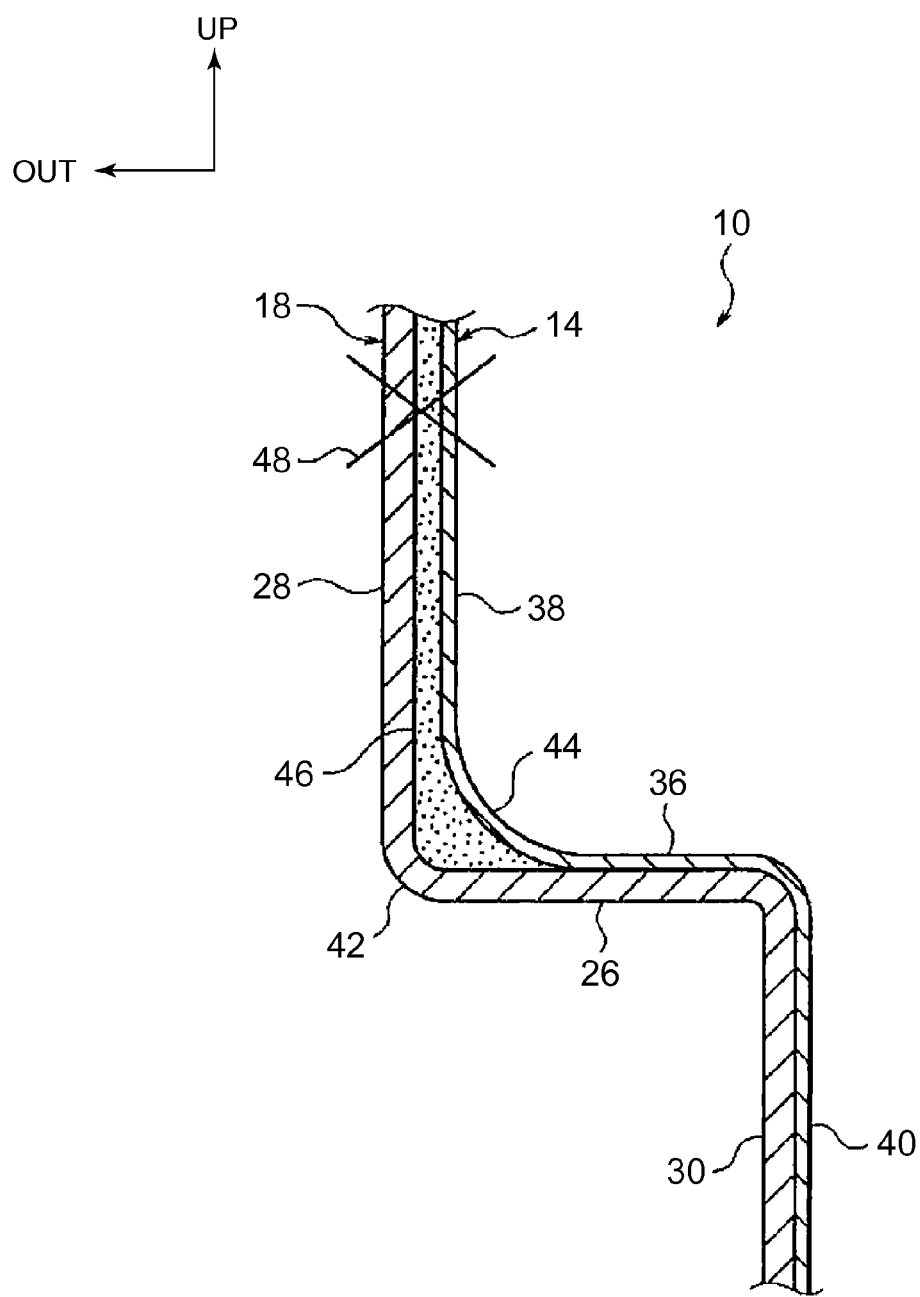
FIG. 2 is a magnified view of an essential part of FIG. 1.

Further, as illustrated in FIG. 2, a connecting portion between the stepped portion 26 and the joining portion 28 is a first bent portion 42, and a connecting portion between the facing portion 36 and the joined portion 38 is a second bent portion 44. The first bent portion 42 and the second bent portion 44 each have a curved section and form a projection toward the vehicle-width-direction outer side and the vehicle lower side. Further, the second bent portion 44 has a curvature radius that is set larger than that of the first bent portion 42.

Further, in a state where the floor panel 14 is assembled to the rocker 12 at a regular assembling position, the facing portion 36 is superimposed on the stepped portion 26 from the vehicle upper side. Further, the joining portion 28 is opposed to the joined portion 38 with a slight gap therebetween, and a space is formed between the first bent portion 42 and the second bent portion 44. The gap between the joining portion 28 and the joined portion 38 and the space between the first bent portion 42 and the second bent portion 44 are provided (filled) with an adhesive 46, and thus, the joining portion 28 and the joined portion 38, and the first bent portion 42 and the second bent portion 44 are joined to each other by the adhesive 46.

Further, the joining portion 28 and the joined portion 38 are welded via welded portions 48 by spot welding, for example. A plurality of welded portions 48 by the spot welding are formed at intervals in the vehicle longitudinal direction.

Note that the facing portion 36 and the stepped portion 26, and the bottom wall portion 30 and the suspended portion 40 are put on top of one another in a contact manner.

Next will be described a panel joining method according to the first embodiment of the present invention.

Initially, as illustrated in an upper view in FIG. 3, in an adhesive application step, the adhesive 46 is applied to a top surface 26A of the stepped portion 26.

Subsequently, as illustrated in a lower view in FIG. 3, in an adhesion step, the floor panel 14 is brought down in a state where the rocker 12 is fixed in the vehicle up-down direction, so that the facing portion 36 is superimposed on the stepped portion 26. Further, when the facing portion 36 is superimposed on the stepped portion 26 as such, the adhesive 46 is extruded so as to be moved to between the joining portion 28 and the joined portion 38. Then, the joining portion 28 and the joined portion 38, and the first bent portion 42 and the second bent portion 44 are adhered to each other by the adhesive 46.

Subsequently, in a welding step, spot welding is performed on the joining portion 28 and the joined portion 38, so that the joining portion 28 and the joined portion 38 are welded by the welded portions 48. According to the above procedure, the rocker inner panel 18 (the rocker 12) is joined to the floor panel 14.

Next will be described operations and effects of the first embodiment of the present invention.

As described above, in the panel joining structure 10 according to the first embodiment of the present invention, the stepped portion 26 extends in the vehicle width direction. Accordingly, even in a case where the adhesive 46 is applied to the top surface 26A of the stepped portion 26 in the adhesive application step as described above, it is possible to restrain the adhesive 46 from dropping due to gravity.

Further, the floor panel 14 includes the suspended portion 40 extending from the facing portion 36 toward the vehicle lower side, and the suspended portion 40 is formed in the other side of the facing portion 36 on the vehicle-width-direction inner side. Accordingly, even in a case where the floor panel 14 is brought down so that the facing portion 36 is superimposed on the stepped portion 26 in the adhesion step as described above, it is possible to restrain the adhesive 46 applied to the top surface 26A of the stepped portion 26 from interfering with the suspended portion 40. This makes it possible to restrain the adhesive 46 from being scraped off by the suspended portion 40.

Thus, it is possible to secure adhesion quality between the joining portion 28 and the joined portion 38 by restraining the adhesive 46 from dropping and from being scraped off, thereby making it possible to improve a joining strength between the rocker inner panel 18 and the floor panel 14.

Further, as described above, when the second bent portion 44 has a curvature radius that is set larger than that of the first bent portion 42, it is possible to form a space between the first bent portion 42 and the second bent portion 44. This allows the adhesive 46 extruded when the facing portion 36 is superimposed on the stepped portion 26, to be smoothly moved to between the joining portion 28 and the joined portion 38 via the space.

Next will be described a modified embodiment of the first embodiment of the present invention.

Figure 4:
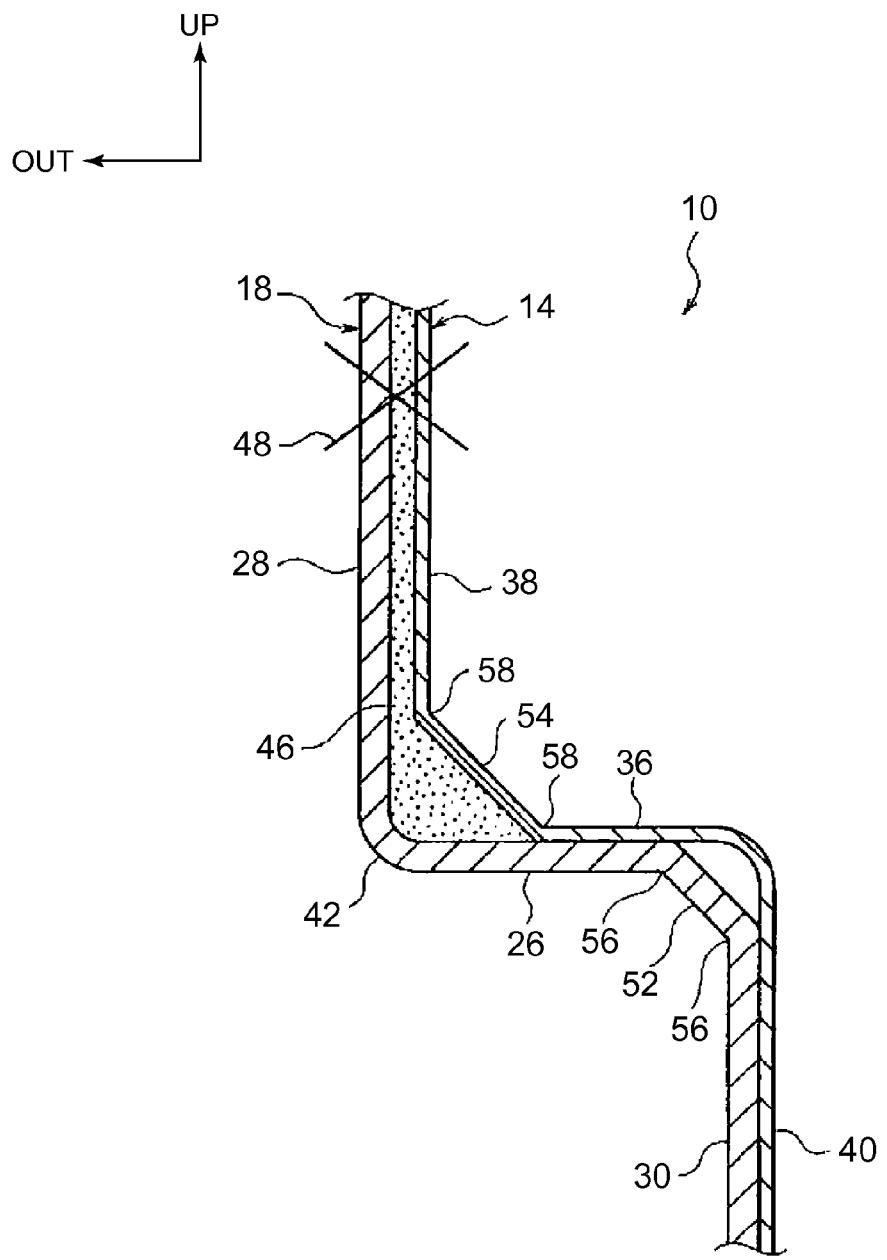
FIG. 4 is a sectional view illustrating a modified embodiment of the panel joining structure illustrated in FIG. 1.

That is, as illustrated in FIG. 4, a first offset surface 52 and a second offset surface 54 may be formed in the connecting portion (a corner) between the stepped portion 26 and the bottom wall portion 30 and in the connecting portion between the facing portion 36 and the joined portion 38, respectively.

According to such a configuration, edge lines 56 are formed in both ends of the first offset surface 52 and edge lines 58 are formed in both ends of the second offset surface 54, thereby making it possible to improve rigidity of a joining part between the rocker inner panel 18 and the floor panel 14.

Further, in the first embodiment of the present invention, the stepped portion 26 extends in the vehicle width direction. However, the stepped portion 26 may be inclined relative to the vehicle width direction provided that the stepped portion 26 extends to the intersecting direction with the vehicle up-down direction.

Further, the panel joining structure 10 is applied to the rocker inner panel 18 and the floor panel 14, but, may be applied to a first panel and a second panel constituting other vehicle body members. Further, in this case, in the adhering step, at least one of the first panel and the second panel may be moved relative to the other one thereof in the vehicle up-down direction, so that the facing portion 36 is superimposed on the stepped portion 26.

Further, in the first embodiment of the present invention, similarly to the joining portion 28 and the joined portion 38, the bottom wall portion 30 and the suspended portion 40 may be welded by performing spot welding thereon. According to such a configuration, it is possible to improve the joining strength between the rocker inner panel 18 and the floor panel 14.

[Second Embodiment]

Next will be described a second embodiment of the present invention.

Figure 5:
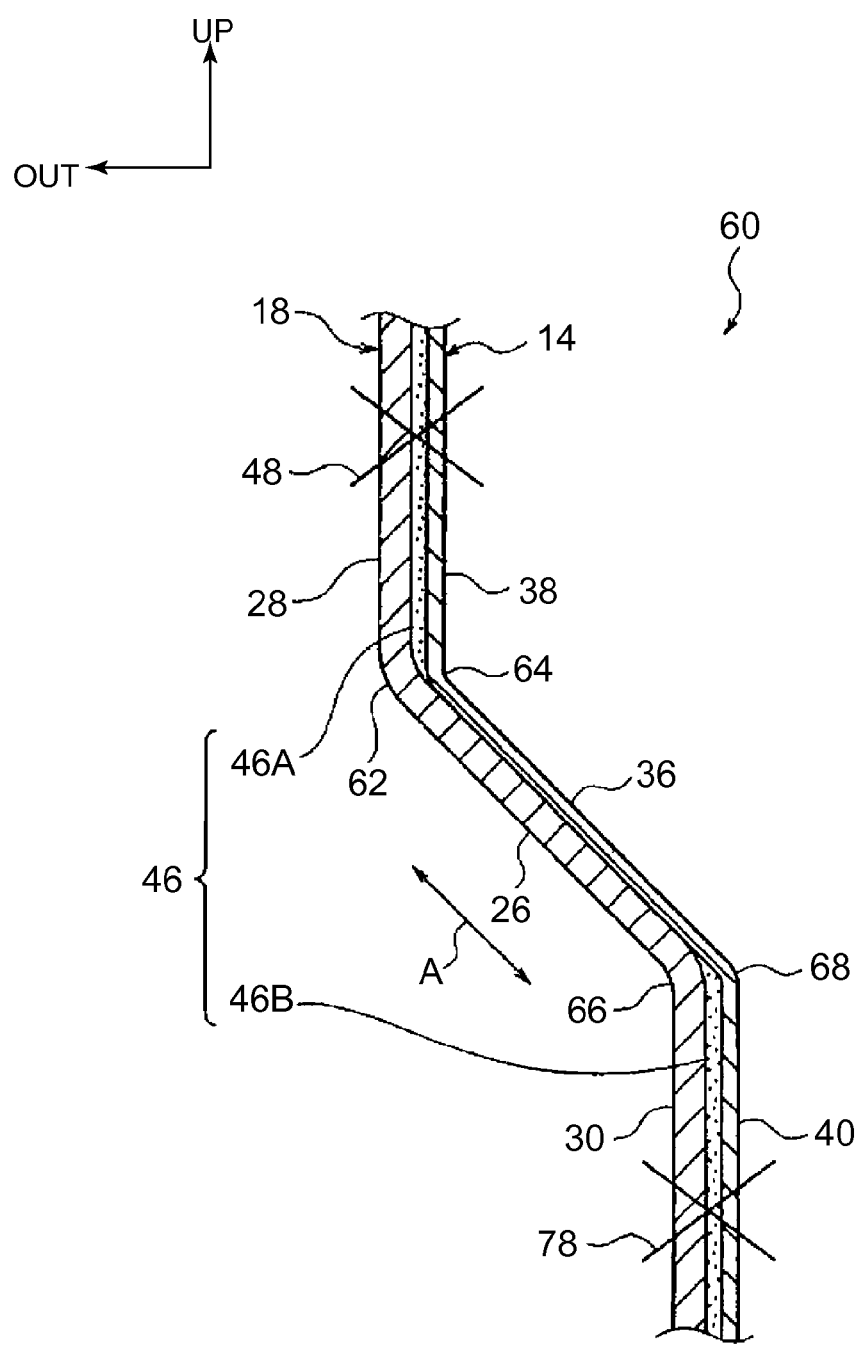
FIG. 5 is a sectional view of a panel joining structure according to a second embodiment of the present invention.

A configuration of a panel joining structure 60 according to the second embodiment of the present invention as illustrated in FIG. 5 is different from the panel joining structure 10 (see FIG. 2) according to the first embodiment of the present invention, as follows.

That is, in the panel joining structure 60, a stepped portion 26 extends in a direction (an arrow-A direction) inclined relative to the vehicle width direction, as one example of the intersecting direction with the vehicle up-down direction. That is, the stepped portion 26 is inclined relative to the vehicle width direction toward the vehicle lower side as it goes to the vehicle-width-direction inner side. Further, a facing portion 36 also extends in the direction inclined relative to the vehicle width direction, similarly to the above stepped portion 26.

Note that, in the second embodiment of the present invention, a joining portion 28 and a joined portion 38 are examples of an upper-side joining portion and an upper-side joined portion in the present invention, and a bottom wall portion 30 and a suspended portion 40 are examples of a lower-side joining portion and a lower-side joined portion in the present invention.

A connecting portion between the stepped portion 26 and the joining portion 28 is a first upper-side bent portion 62, and a connecting portion between the facing portion 36 and the joined portion 38 is a second upper-side bent portion 64. Further, a connecting portion between the stepped portion 26 and the bottom wall portion 30 is a first lower-side bent portion 66, and a connecting portion between the facing portion 36 and the suspended portion 40 is a second lower-side bent portion 68. The first upper-side bent portions 62, the second upper-side bent portion 64, the first lower-side bent portion 66, and the second lower-side bent portion 68 each have a curved section.

Further, in a state where a floor panel 14 is assembled to a rocker 12 at a regular assembling position, the facing portion 36 is superimposed on the stepped portion 26 from the vehicle upper side. Further, the joining portion 28 and the joined portion 38, and the bottom wall portion 30 and the suspended portion 40 are opposed to each other with a slight gap therebetween.

The gap between the joining portion 28 and the joined portion 38 is provided (filled) with an upper-side adhesive 46A of an adhesive 46, and thus, the joining portion 28 and the joined portion 38 are joined to each other by the upper-side adhesive 46A. Further, the gap between the bottom wall portion 30 and the suspended portion 40 is provided with a lower-side adhesive 46B of the adhesive 46, and thus, the bottom wall portion 30 and the suspended portion 40 are joined to each other by the lower-side adhesive 46B.

Further, similarly to the joining portion 28 and the joined portion 38, the bottom wall portion 30 and the suspended portion 40 are welded via welded portions 78 by spot welding. A plurality of welded portions 78 by the spot welding are formed at intervals in the vehicle longitudinal direction.

Note that the facing portion 36 and the stepped portion 26 are put on top of one another in a contact manner.

Next will be described a panel joining method according to the second embodiment of the present invention.

Figure 6:
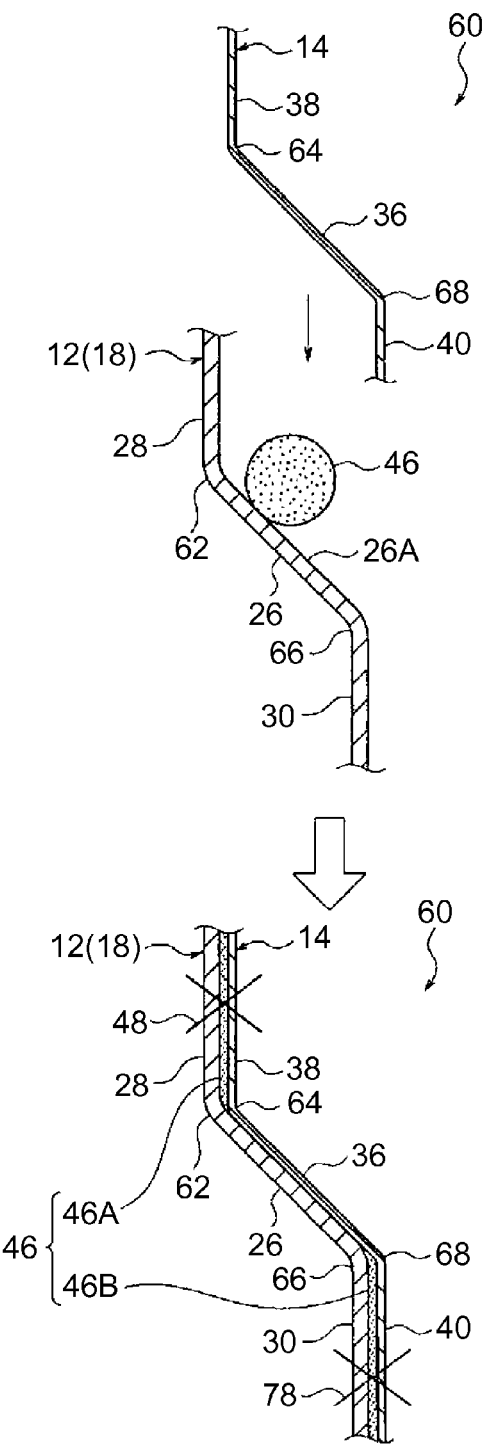
FIG. 6 is a view to describe a method for joining a rocker inner panel and a floor panel illustrated in FIG. 5.

Initially, as illustrated in an upper view in FIG. 6, in an adhesive application step, the adhesive 46 is applied to a top surface 26A of the stepped portion 26.

Subsequently, as illustrated in a lower view in FIG. 6, in an adhesive step, the floor panel 14 is brought down in a state where the rocker 12 is fixed in the vehicle up-down direction, so that the facing portion 36 is superimposed on the stepped portion 26. Further, when the facing portion 36 is superimposed on the stepped portion 26 as such, the adhesive 46 is extruded so as to be moved to between the joining portion 28 and the joined portion 38, and between the bottom wall portion 30 and the suspended portion 40. Then, the joining portion 28 is adhered to the joined portion 38 by that upper-side adhesive 46A of the adhesive 46 which is moved to the vehicle upper side, and the bottom wall portion 30 is adhered to the suspended portion 40 by that lower-side adhesive 46B of the adhesive 46 which is moved to the vehicle lower side.

Subsequently, in a welding step, spot welding is performed on the joining portion 28 and the joined portion 38, and on the bottom wall portion 30 and the suspended portion 40, so that the joining portion 28 and the joined portion 38 are welded by the welded portions 48, and the bottom wall portion 30 and the suspended portion 40 are welded by the welded portions 78. According to the above procedure, a rocker inner panel 18 (the rocker 12) is joined to the floor panel 14.

Next will be described operations and effects of the second embodiment of the present invention.

As described above, in the panel joining structure 60 according to the second embodiment of the present invention, the stepped portion 26 extends in the intersecting direction with the vehicle up-down direction (the direction inclined relative to the vehicle width direction). Accordingly, even in a case where the adhesive 46 is applied to the top surface 26A of the stepped portion 26 in the adhesive application step as described above, it is possible to restrain the adhesive 46 from dropping due to gravity.

Further, the floor panel 14 includes the suspended portion 40 extending from the facing portion 36 toward the vehicle lower side, and the suspended portion 40 is formed in the other side of the facing portion 36 on the vehicle-width-direction inner side. Accordingly, even in a case where the floor panel 14 is brought down so that the facing portion 36 is superimposed on the stepped portion 26 in the adhesion step as described above, it is possible to restrain the adhesive 46 applied to the top surface 26A of the stepped portion 26 from interfering with the suspended portion 40. This makes it possible to restrain the adhesive 46 from being scraped off by the suspended portion 40.

Thus, it is possible to secure adhesion quality between the joining portion 28 and the joined portion 38 by restraining the adhesive 46 from dropping and from being scraped off, thereby making it possible to improve a joining strength between the rocker inner panel 18 and the floor panel 14.

Further, since the joining portion 28 is joined to the joined portion 38 by adhesion and welding and the bottom wall portion 30 is joined to the suspended portion 40 by adhesion and welding, it is possible to further improve the joining strength between the rocker inner panel 18 and the floor panel 14.

Note that the second embodiment of the present invention may be combined with each of the aforementioned modified embodiments in the first embodiment of the present invention.

Embodiments of the present invention have been described above, but the present invention is not limited to the above and may be modified in various ways to be performed as long as the modified examples are not beyond the gist thereof.

The invention claimed is:

1. A panel joining structure comprising:
a rocker inner panel constituting a vehicle-width-direction inner portion of a rocker provided adjacent to a floor of a vehicle interior and including a stepped portion extending in a direction intersecting a vertical direction, and a joining portion extending vertically upward from one end of the stepped portion; and
a floor panel constituting the floor of the vehicle interior and including a facing portion extending in the direction intersecting the vertical direction and superimposed on top of the stepped portion, a joined portion extending vertically upward from one end of the facing portion and joined to the joining portion by adhesion and welding, and a suspended portion extending vertically downward from the other end of the facing portion.

2. The panel joining structure according to claim 1, wherein:
- a connecting portion between the stepped portion and the joining portion is a first bent portion having a curved section;
- a connecting portion between the facing portion and the joined portion is a second bent portion having a curved section; and
- the second bent portion has a curvature radius that is set larger than that of the first bent portion.

3. The panel joining structure according to claim 1, wherein:
- the rocker inner panel includes an upper-side joining portion as the joining portion, and a lower-side joining portion extending vertically downward from the other end of the stepped portion; and
- the suspended portion is joined to the lower-side joining portion by adhesion and welding.

4. A panel joining method for joining the rocker inner panel and the floor panel in the panel joining structure according to claim 3, the panel joining method comprising:
- applying an adhesive to a top surface of the stepped portion;
- adhering the joining portion to the joined portion by the adhesive by moving at least one of the rocker inner panel and the floor panel relative to the other one thereof in the vertical direction so as to superimpose the facing portion on the stepped portion and moving the adhesive to between the joining portion and the joined portion by superimposing the facing portion on the stepped portion; and
- of welding the joining portion and the joined portion.

5. A panel joining method for joining the rocker inner panel and the floor panel in the panel joining structure according to claim 2, the panel joining method comprising:
- applying an adhesive to a top surface of the stepped portion;
- adhering the joining portion to the joined portion by the adhesive by moving at least one of the rocker inner panel and the floor panel relative to the other one thereof in the vertical direction so as to superimpose the facing portion on the stepped portion and moving the adhesive to between the joining portion and the joined portion by superimposing the facing portion on the stepped portion; and
- welding the joining portion and the joined portion.

6. A panel joining method for joining the rocker inner panel and the floor panel in the panel joining structure according to claim 1, the panel joining method comprising:
- applying an adhesive to a top surface of the stepped portion;
- adhering the joining portion to the joined portion by the adhesive by moving at least one of the rocker inner panel and the floor panel relative to the other one thereof in the vertical direction so as to superimpose the facing portion on the stepped portion and moving the adhesive to between the joining portion and the joined portion by superimposing the facing portion on the stepped portion; and
- welding the joining portion and the joined portion.

* * * * *